April 5, 1927.

F. SWIFT

TAPE MEASURE

Filed July 23, 1926

1,623,138

Inventor
Frank Swift
by Fetherstonhaugh & Co.
Attys.

Patented Apr. 5, 1927.

1,623,138

UNITED STATES PATENT OFFICE.

FRANK SWIFT, OF TORONTO, ONTARIO, CANADA.

TAPE MEASURE.

Application filed July 23, 1926, Serial No. 124,481, and in Canada August 13, 1925.

My invention relates to improvements in tape measures, and the object of my invention is to devise means by which a tape measure may be handled by one person when measuring long lengths such as in timber and thereby insure of obtaining accurate measurement and it consists essentially of the arrangement and construction of parts as hereinafter more particularly described.

In the drawings like characters of reference indicate corresponding parts in each figure.

1 indicates a board.

2 is an ordinary tape measure provided at its free end with the usual loop 3.

4 is a catch which is formed of sheet metal, the lower edge being bent inward as indicated at 4$^x$, the end edge of the portion 4$^x$ being provided with teeth 5 adapted to have a gripping engagement with the board end.

Figure 1:
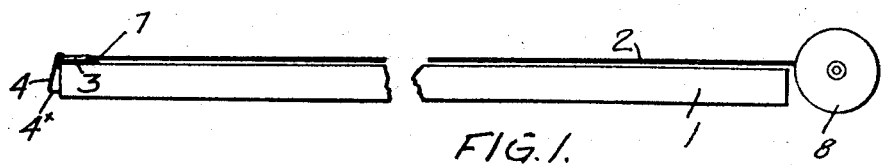
Fig. 1 is a side elevation of an ordinary tape measure and a board intermediately broken away of their length, and showing my device applied thereto.
Figure 2:
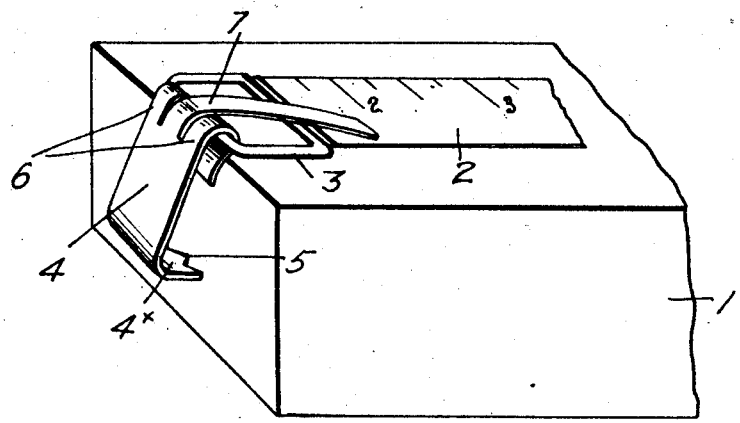
Fig. 2 is an enlarged perspective detail of my device showing its application.

6 are loops which are sprung over the outer portion of the tape loop 3 and 7 is a tongue extending from the upper end of catch 4, from between the loops 6 so as to extend downward through the loop 3 beneath the tape measure as clearly indicated in Fig. 2.

When a single person desires to measure long lengths of timber alone all he has to do is to spring the device 4 into position by engaging the loop 6 with the loop 3 in the position indicated in Fig. 3 with the tongue 7 extending through the loop.

When in this position the teeth 5 are engaged with the end of the timber and when tension is exerted on the tape measure as it is drawn in the usual manner from the reel 8 the teeth 5 grip the end of the timber being held in a gripping position by the pressure of the tongue 7 and thereby providing a secure hold for the free end of the tape measure upon the timber as the user of the tape measure passes to the opposite end of the piece of timber. As soon as the measuring operation is completed the relaxing of the tension on the measure releases the pressure upon the tongue 7 thereby permitting the teeth 5 to free themselves automatically from the end of the timber to permit the tape measure being rewound into the wheel.

By the employment of my device not only does it enable a single person to use the tape measure in measuring long lengths such as in lumber but it also overcomes the danger arising from employing another person to hold the free end of the tape measure and through carelessness or any other reason may not hold the end of the tape measure accurately at the end of the piece of lumber thereby giving an inaccurate measure.

In measuring a large amount of lumber a small inaccuracy in measuring each piece would amount to a great difference in the aggregate resulting in considerable monetary loss to the purchaser.

What I claim as my invention is:

In a tape measure, the combination with the looped end of the tape, of a catch piece comprising a central plate body portion, an end portion divided longitudinally to form three fingers, the two outer fingers being bent into spring hook form and the centre finger extending substantially at right angles to the body and adapted to bear on the tape when the spring hooks are in engagement with the loop of the tape, and an inturned piece at the opposite end of the body having a serrated edge adapted to grip the end of the article to be measured when the central finger at the opposite end of the body is in engagement with the tape when resting upon the top of the article to be measured.

FRANK SWIFT.